United States Patent [19]
Kingsford

[11] Patent Number: 5,476,004
[45] Date of Patent: Dec. 19, 1995

[54] LEAK-SENSING APPARATUS

[75] Inventor: Kenji A. Kingsford, Devore, Calif.

[73] Assignee: Furon Company, Laguna Niguel, Calif.

[21] Appl. No.: 249,952

[22] Filed: May 27, 1994

[51] Int. Cl.[6] .............................. G01M 3/00; G01N 1/00
[52] U.S. Cl. .................... 73/40; 73/863.33; 73/864.51; 137/312
[58] Field of Search .................... 73/40, 40.5 R, 73/46, 49.1, 863.33, 864.51, 864.64; 137/558, 312; 340/605, 619, 603; 250/573, 901

[56] References Cited

U.S. PATENT DOCUMENTS

| | | | |
|---|---|---|---|
| 2,531,159 | 11/1950 | Rowell | 340/605 X |
| 3,428,073 | 2/1969 | Krueger | 137/312 |
| 3,561,475 | 2/1971 | Rockwell | 137/606 |
| 3,721,270 | 3/1973 | Wittgenstein | 138/104 |
| 4,386,269 | 5/1983 | Murphy | 250/227 |
| 4,573,343 | 3/1986 | Huiber | 73/40 |
| 4,576,037 | 3/1986 | Cox | 73/40.5 R |
| 4,874,007 | 10/1989 | Taylor | 73/40.5 R X |
| 4,901,751 | 2/1990 | Story et al. | 137/312 |
| 4,972,867 | 11/1990 | Ruesch | 73/46 X |
| 5,148,699 | 9/1992 | Morse | 73/40 |
| 5,170,659 | 12/1992 | Kemp | 73/46 |
| 5,203,370 | 4/1993 | Block et al. | 73/46 X |
| 5,235,324 | 8/1993 | Gagnebin | 340/626 |
| 5,263,682 | 11/1993 | Covert et al. | 73/46 X |

FOREIGN PATENT DOCUMENTS

| | | | |
|---|---|---|---|
| 0035243 | 2/1985 | Japan | 340/619 |
| 0203944 | 8/1989 | Japan | 340/605 |

Primary Examiner—Hezron E. Williams
Assistant Examiner—Michael J. Brock
Attorney, Agent, or Firm—Christie, Parker & Hale

[57] ABSTRACT

A leak-sensing apparatus comprises a gas module, at least one liquid inlet module, a sensor module, and a base module in fluid flow communication and air and liquid-tight attachment with one other. The gas module comprises means for accommodating a predetermined volume of gas and leaking liquid and means for ensuring the containment of gas and leaking liquid therein. Each liquid inlet module comprises at least one liquid inlet port for accommodating the passage of gases and leaking liquids from a fluid handling device to an internal chamber, and means for ensuring one-way passage of gases and liquids into the apparatus. The sensor module comprises a sensing chamber and means for detecting the presence of leaking liquid therein. Air displaced by the entering gases and leaking liquids is vented from the apparatus to the atmosphere or routed to an air purification device while the entering gases and liquids are contained safely within, ensuring no release of potentially harmful chemical gases and liquids to the environment.

32 Claims, 5 Drawing Sheets

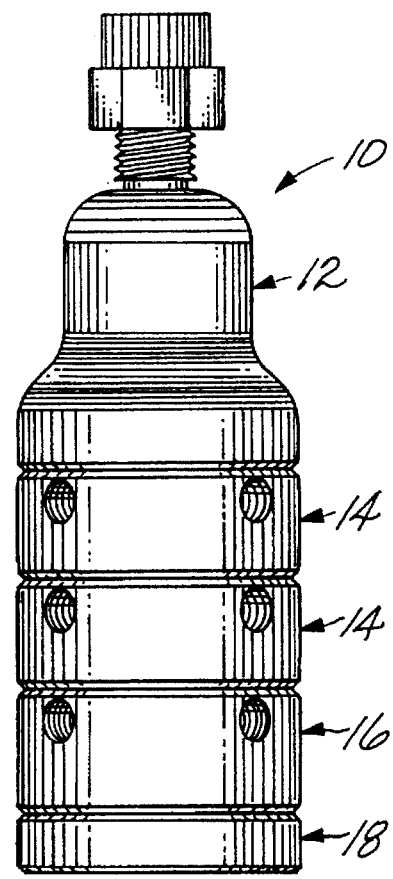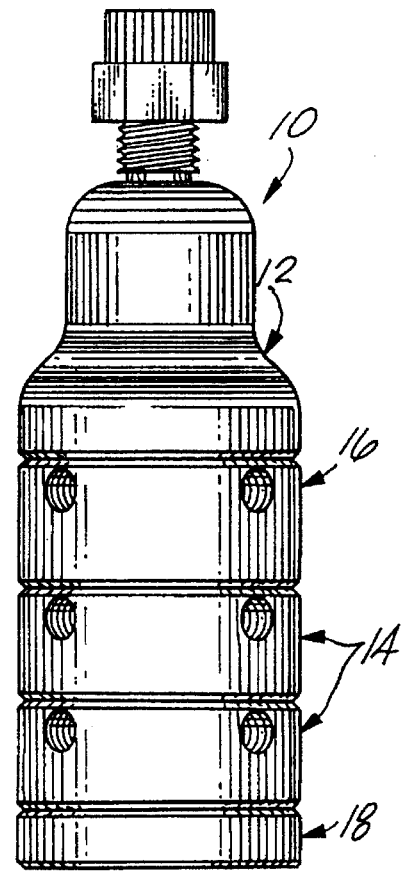

LEAK-SENSING APPARATUS

FIELD OF THE INVENTION

This invention relates generally to a sensing apparatus used to detect the presence of liquid and, more particularly, to a sensing apparatus used to detect the leakage of liquid from a failed fluid-handling device in a manner that is closed to the environment using non-invasive intrinsically safe detection means.

BACKGROUND OF THE INVENTION

In the manufacture of semiconductors a variety of highly corrosive chemicals, such as strong inorganic acids, strong inorganic bases, peroxides, and strong solvents, are used during an etching process to form the large number of signal traces or conduction paths that are contained in each semiconductor. In order to make the manufacturing process as efficient as possible, strong acids and bases are selected and then heated to decrease the amount of time required to complete the etching step. Accordingly, because of the extreme nature of the process chemicals and the operating conditions used in the semiconductor manufacturing industry, it is desirable that the fluid-handling devices involved in transporting such process chemicals be operated in a manner that insures that such potentially hazardous chemicals will not be released into the environment in the event of a failure of the fluid-handling device.

Additionally, the advance of technology has brought with it the need to electrically process information and perform functions at a quickened speed. Simultaneous with this need for quickened process time is the desire to keep the size of the electronic information processor down to a minimum. To achieve both of these features semiconductors are now designed to contain more process functions and features per unit size than previously available, i.e., increasing the component density of each semiconductor. One way that increased component density is achieved is by reducing the size of each component.

The extremely small scale of components used to construct semiconductor, and the need to further reduce the scale to enhance component density, has required the implementation of ever increasing quality control guidelines during the manufacturing process. The quality control guidelines have now progressed to the point where human operators are no longer allowed within the semiconductor manufacturing area because of the contamination risk from foreign objects such as dust, dirt and the like, that is associated with the presence of human operators.

Before these stringent quality control guidelines were implemented, human operators were routinely involved in the semiconductor manufacturing process. Accordingly, the leakage or failure of a fluid-transport device used in the manufacturing process could be visually detected by an operator. However, leak detection by operator observation was not the best method of detecting leakage or failure of the fluid-handling device due to inherent leakage of the process chemical into the environment. Liquid leakage was typically contained within a sump built around the perimeter of the fluid-handling device, posing a potential environmental hazard if not properly cleaned up, i.e., toxic vapors escaping to the atmosphere or toxic liquids leaking into the soil, and a potential health danger to operators working near the leak.

Accordingly, a need exists for an apparatus for sensing liquid leaking from a failed fluid-handling device that is capable of functioning without the need for operator presence or intervention. It is desirable that the leak-sensing apparatus be capable of detecting the leakage of liquid from a failed fluid-transport device in a manner that does not release the leaking liquid or vapor generated by the leaking fluid handling device to the environment, i.e., a closed system. It is desirable that the leak-sensing apparatus have the capability of detecting liquid leakage from more than one fluid-transport device, have a minimum number of moving parts to provide reliability, and be spatially efficient, i.e., occupy a relatively small space to promote its use in close areas. It is desirable that the leak-sensing apparatus be made from a material that is resistant to both the highly corrosive chemicals and temperature conditions that are used in the semiconductor manufacturing industry to ensure containment integrity of the leaking chemical and to reduce the possibility of process contamination. It is also desirable that the leak-sensing apparatus use a method of detection that is intrinsically safe and will not present an explosion hazard.

SUMMARY OF THE INVENTION

A leak-sensing apparatus for detecting the presence of liquid leaking from a fluid handling device comprises a gas module, at least one liquid inlet module, a sensor module, and a base module that are each in fluid flow communication with one another and removably attached to one another using O-ring seals to ensure an air and liquid-tight seal so that all gases and liquids entering the apparatus are contained therein. The gas module comprises means for accommodating a predetermined volume of gas passed into the apparatus and means for ensuring that such gasses are contained within the apparatus.

Each liquid inlet module comprises at least one liquid inlet port for accommodating the passage of gases and leaking liquids from a fluid handling device to an internal chamber and means for ensuring one-way passage of gases and liquids into the apparatus. The sensor module comprises a sensing chamber in fluid flow communication with the internal chamber of each liquid inlet module, and means for detecting the presence of leaking liquid within the sensing chamber that is both non-invasive and intrinsically safe. The base module comprises a substantially solid member having a planer backside surface for accommodating the placement or mounting of the apparatus on a planer surface.

Leaking liquid from a fluid handling device passes through a liquid transport tube and into a liquid inlet port of the liquid inlet module where, after the head pressure of the leaking liquid and any trapped gases in the tube line overcomes the means for ensuring one-way flow into the apparatus, it enters the internal chamber. The leaking liquid flows downwardly by gravity from the internal chamber to the base module and fills the sensing chamber. The leaking liquid level in the sensing chamber rises until a predetermined point is reached where the means for leak detection registers the presence of the liquid, triggering an alarm or the shut down of the fluid handling device.

The air volume within the apparatus that is displaced by the entering gases and leaking liquid is vented to the atmosphere or to an air purification device through an air outlet while the gases and leaking liquid are safely contained within the apparatus, ensuring no release of potentially hazardous and toxic chemical liquids or chemical gases to the environment.

BRIEF DESCRIPTION OF THE DRAWINGS

These features and advantages of the invention, as well as other features and advantages of the invention, will be more apparent from a reading of the claims and the detailed description of the invention in conjunction with the drawings described below:

FIG. 7 is a cross-sectional side view of an alternative embodiment of a leak-sensing apparatus constructed according to principles of this invention comprising two of the liquid inlet modules shown in FIG. 3; and FIG. 8 is a cross-sectional side view of an alternative embodiment of a leak-sensing apparatus constructed according to principles of this invention comprising the sensor module of FIG. 4 interposed between a gas module and a stack of two liquid inlet modules.

DETAILED DESCRIPTION

Figure 1:
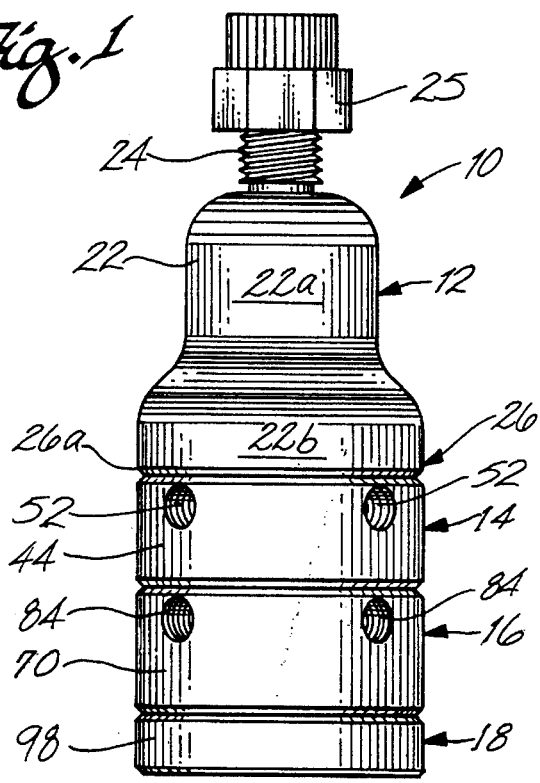
FIG. 1 is a side view of a preferred embodiment of a leak-sensing apparatus constructed according to principles of this invention.

A side view of a preferred embodiment of a leak-sensing apparatus 10 constructed according to principles of this invention is shown in FIG. 1. Generally speaking, the leak-sensing apparatus is formed from a number of serially connected modules that are connected together to provide a central chamber for collecting and detecting the presence of liquid entering the apparatus from a failed fluid handling device. The apparatus also comprises an internal gas chamber to accommodate and contain a volume of gas that precedes any liquid that is transported to the apparatus from a failed fluid handling device, thereby eliminating any potentially hazardous or environmentally harmful discharge of gas into the atmosphere. The apparatus comprises a non-invasive and intrinsically safe means for detecting the presence of liquid transported into the apparatus and contained within the central chamber such as fiber-optics, ultrasonics, conductivity, capacitive technology and the like.

Although the leak-sensing apparatus of the present invention can be positioned in any orientation, for purposes of exposition herein, the position of the modules making up the apparatus relative to each other are described as if the device is orientated as shown in FIG. 1, sitting on a horizontal surface.

Referring to FIG. 1, the apparatus 10 comprises a gas module 12 positioned at the physical top of the apparatus, a liquid inlet module 14 positioned adjacent to one end of the gas module 12, a sensor module 16 positioned adjacent one end of the liquid inlet module opposite the gas module, and a base module 18 positioned adjacent one end of the sensor module opposite the liquid inlet module. As better shown in FIG. 2, the liquid inlet module 14, sensor module 16, and base module cumulatively form a central liquid chamber 20 for accommodating a predetermined volume of liquid entering the apparatus from a failed fluid handling device.

Figure 2:
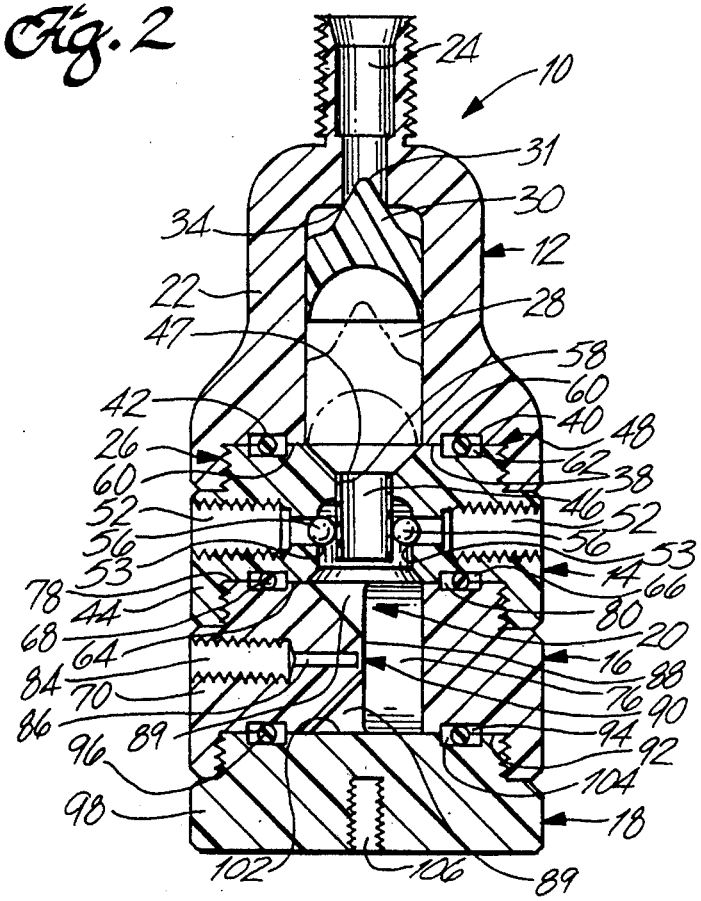
FIG. 2 is a cross-sectional side view of the preferred embodiment of the leak-sensing apparatus shown in FIG. 1.
Figure 5:
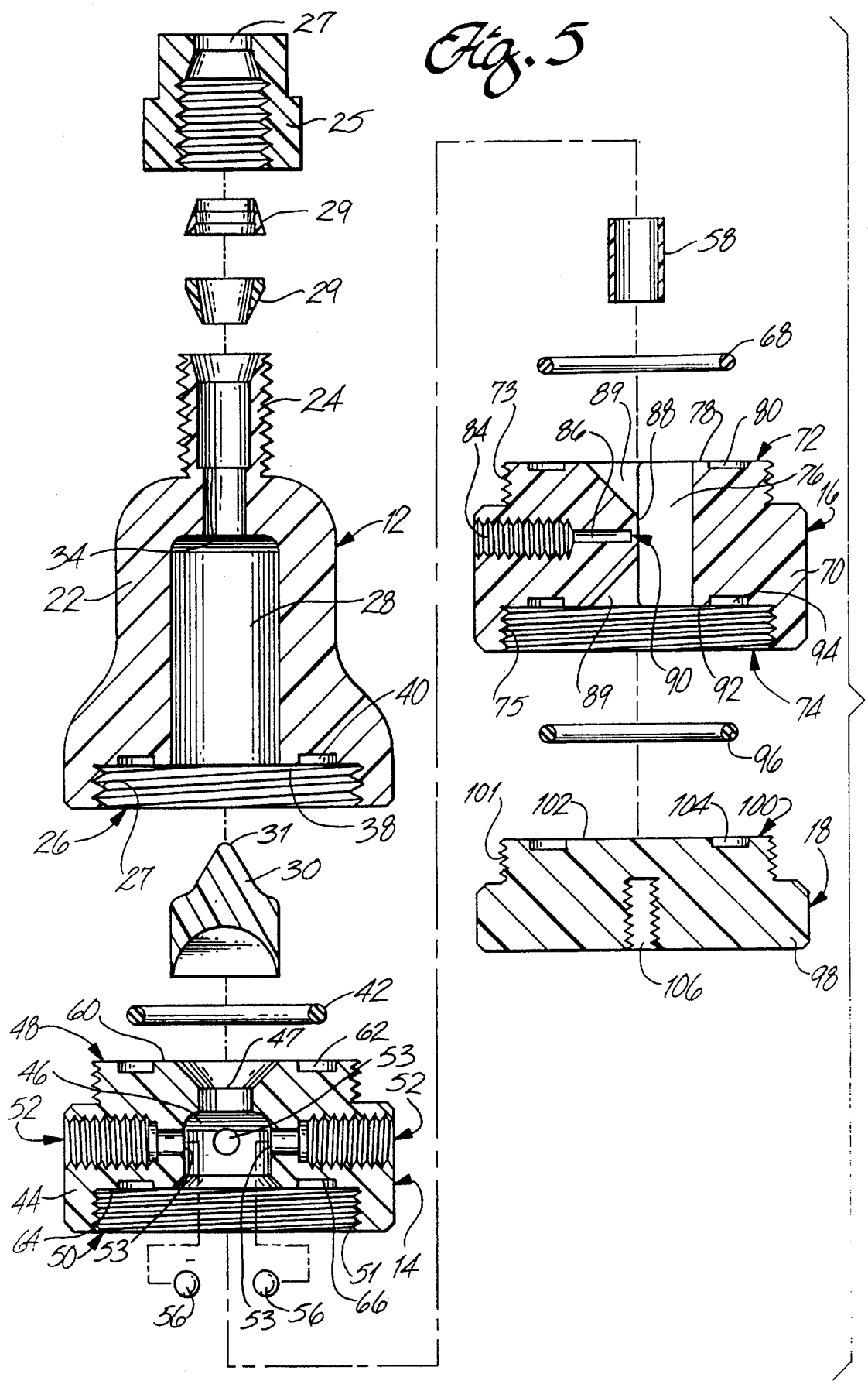
FIG. 5 is an exploded cross-sectional side view of the preferred embodiment of the leak-sensing apparatus shown in FIGS. 1 and 2.

Referring to FIGS. 1, 2 and 5, the gas module 12 comprises an annular housing 22 having a substantially bell-shaped configuration with an air outlet 24 at one end positioned near the physical top of the gas module, and an attachment opening 26 for connecting with an adjacent module at the opposite end near the physical bottom of the gas module. The air outlet 24 comprises a threaded coupling for accommodating threadable engagement with an outlet nut 25. As best shown in FIG. 5, the outlet nut comprises an opening 27 for accommodating the placement of an air transfer tube (not shown) within. Tube fittings 29 are fitted into a flared end of the air outlet 24 to engagably secure an outside surface of the air transfer tube within the air outlet and outlet nut upon tightening the nut onto the air outlet.

As best illustrated in FIGS. 2 and 5, the gas module comprises an internal cavity forming a gas accommodation chamber 28 that extends axially within the gas module housing. The chamber 28 is configured having a predetermined volume to accommodate a volume of gas that precedes any liquid that may enter the apparatus from a failed fluid handling device.

In a preferred embodiment, the bell-shaped housing 22 is formed from a first cylindrical portion 22a near the physical top of the housing having an outside diameter of approximately 25 millimeters (1 inch), and a second cylindrical portion 22b near the physical bottom of the housing having an outside diameter of approximately 38 millimeters (1½ inches). The height of a preferred gas module, as measured from the base 26a of the attachment opening 26 to the tip of the air outlet 24 is approximately 50 millimeters (2 inches).

Referring to FIG. 2, a piston 30 is positioned within the chamber 28. The piston has a configuration sized and shaped to facilitate slidable axial movement within the chamber 28 without allowing gas to pass between the piston and the wall of the chamber. The piston is configured having a wedged or pointed end 31 and is positioned in the chamber with the pointed portion directed toward the air outlet 24. The configuration and placement of the piston within the chamber serves to both limit the upward movement of the piston and restrict the passage of gas from inside the apparatus, through the chamber 28, and out the air outlet 24 by the interaction of the piston against a partially closed inlet opening 34 of the air outlet 24.

In a preferred embodiment, the chamber 28 has an axial length of approximately 25 millimeters (1 inch) and a diameter of approximately 13 millimeters (½ inch). The piston 30 has a diameter of approximately the same dimension as the chamber to ensure an air-tight fit to prevent gas from passing thereby.

The attachment opening 26 may be formed having a conventional threaded coupling for threadable engagement with a complementary attachment opening of an adjacent apparatus member. In a preferred embodiment the attachment opening 26 is formed having a conventional threaded female coupling 27. The attachment opening comprises a circular generally planer sealing surface 38 recessed a predetermined distance from the threaded female coupling and perpendicular to the axis along the height of the chamber 28. The sealing surface comprises a slot 40 positioned radially around the sealing surface that extends a predetermined depth into the sealing surface. The slot is configured to partially accommodate the thickness of an O-ring 42 used to ensure an air and liquid-tight seal between the gas module and an adjacent apparatus member.

As shown in FIGS. 1, 2 and 5, the apparatus member connected to the gas module in a preferred embodiment is the liquid inlet module 14. The liquid inlet module comprises an annular housing 44 having a cylindrical configuration and an internal chamber 46 therein. As shown in FIGS. 2 and 5, the liquid inlet module has an attachment opening 48 at one end located near the physical top of the housing 44 for attachment with the gas module 12, and an attachment opening 50 at the opposite end of the housing 44 located near the physical bottom to accommodate attachment with an adjacent apparatus member. The attachment openings 48 and 50 may be configured having a conventional threaded coupling. In a preferred embodiment, the attachment opening 48 has a male threaded coupling to accommodate threadable engagement with the attachment opening 26 of the gas module.

In a preferred embodiment, the housing 44 has an outside diameter of approximately 38 millimeters (1½ inches), i.e, the same dimension as the diameter for the second cylindrical portion of the gas module, and has a wall length of approximately 14 millimeters (9/16 inches). As best shown in FIGS. 2 and 5, the internal chamber is configured having a circular opening 47 near the attachment opening 48 having a diameter of approximately 6 millimeters (¼ inch).

Referring to FIGS. 1, 2 and 5, a number of liquid inlet ports 52 extend from outside the housing radially inward through the housing 44 and to the internal chamber 46. Each inlet port may be configured to accommodate slidable interaction with a liquid transfer tube (not shown) therein. In a preferred embodiment, each inlet port 52 is configured having a threaded wall to accommodate threadable engagement with a threaded portion of a respective transfer tube. Each inlet port is threaded only a partial portion of the depth into the housing, extending roughly from the outside wall of the housing to a position midway between the internal chamber 46 and the outside wall. The remaining portion of each inlet port is non-threaded and extends to the internal chamber. In a preferred embodiment, the threaded portion of each inlet port has a diameter of approximately 5 millimeters (3/16 inches), and the non-threaded portion of each inlet port has a diameter of approximately 2 millimeters (1/16 inches).

Figure 3:
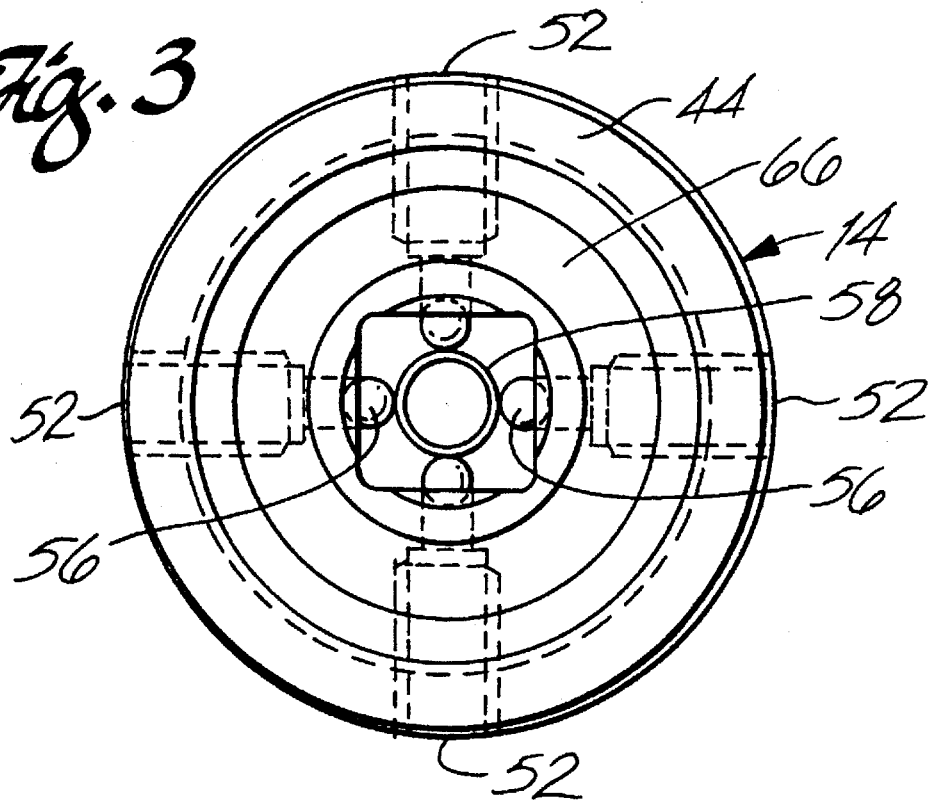
FIG. 3 is a bottom plan semi-schematic view of a liquid inlet module used to form the leak-sensing apparatus shown in FIGS. 1 and 2.

As best shown in FIGS. 2, 3 and 5, check balls 56 are located within a portion of the internal chamber 46 and are positioned against an outlet end 53 of each respective inlet port, forming a checked one-way transfer of liquid and/or air from the transfer tubes into the internal chamber and thereby preventing liquid and/or air transfer from the internal chamber to the transfer tubes. In a preferred embodiment, each check ball has a diameter of approximately 3 millimeters (⅛ inches), and the portion of the chamber 46 accommodating the check balls has a square configuration, as best shown in FIG. 3, with equidistant wall dimensions of approximately 10 millimeters (⅜ inches).

The check balls may be held in compressive engagement against the inlet port by a resilient retaining means such as a spring or the like. For use in the semiconductor industry, where process contamination is a large concern, it is desired that the resilient means not be one that will thermally or chemically degrade or cause ionic contamination when exposed to the highly corrosive semiconductor process chemicals. In a preferred embodiment, the resilient retaining means comprises a cylindrical tube 58 made from a thermal and chemical resistant material such as a fluoropolymeric compound or the like. The tube 58 is selected to have a diameter of sufficient dimension to impose a predetermined degree of compressive force on the check balls to allow transfer of liquid and/or air from a failed fluid handling device, through the transfer tube, and into the internal chamber 46. In a preferred embodiment, the resilient tube 58 has an outside diameter of approximately 5 millimeters (3/16 inches), and a length of approximately 10 millimeters (⅜ inches). The tube 58 is positioned axially within the internal chamber with its outside diameter against each of the check balls to impose the predetermined checking force. In a preferred embodiment, the tube imposes a sufficient force on each check ball such that a pressure of liquid or gas within a transfer tube in the range of from ½ to 5 psig is needed to unseat a respective check ball to allow the transfer of leaking liquid and/or gas into the apparatus.

The number of liquid inlet ports 52 per each liquid inlet module 14 depends on the number of fluid handling devices to be monitored by the apparatus. In a preferred embodiment, the liquid inlet module 14 comprises four liquid inlet ports, each port positioned at approximately 90 degree intervals from each other, as best shown in FIG. 3. Accordingly, the corresponding liquid inlet module 14 comprises four check balls 56, each compressively engaged against a respective inlet port opening by interaction with the resilient tube 58.

As is best seen in FIGS. 2 and 5, the attachment opening 48 in the inlet module housing 44 comprises a circular generally planer sealing surface 60 perpendicular to the axis of the internal chamber 46. The sealing surface has a slot 62 positioned radially around the sealing surface that extends a predetermined depth into the sealing surface. The slot partially accommodates the thickness of the O-ring 42 used to ensure an air and liquid-tight seal between the gas module 12 and the liquid inlet module 14. The attachment opening 50 comprises a threaded female coupling 51 to accommodate threadable engagement with a complementary apparatus member. Attachment opening 50 has a recessed circular generally planer sealing surface 64 perpendicular to the axis of the internal chamber 46. The sealing surface comprises a slot 66 positioned radially around the sealing surface 64 that extends a predetermined depth into the sealing surface to partially accommodate the thickness of an O-ring 68 used to ensure an air and liquid-tight seal between the liquid inlet module 14 and an adjacent apparatus member.

As shown in FIGS. 1, 2 and 5, the apparatus member connected to the liquid inlet module 14 in a preferred embodiment is the sensor module 16. The sensor module 16 comprises an annular housing 70 having a cylindrical configuration with an attachment opening 72 at one end positioned near the physical top of the housing and an attachment opening 74 at an opposite end near the physical bottom of the housing. A sensing chamber 76 is located within the housing 70 and extends axially from attachment opening 72 to attachment opening 74. In a preferred embodiment, the attachment opening 72 comprises a threaded male coupling 73 to accommodate threadable engagement with the attachment opening 50 of the liquid inlet module 14. The attachment opening 72 comprises a circular generally planer sealing surface 78 positioned perpendicular to the axis of the sensing chamber 76. The sealing surface comprises a slot 80 positioned radially around the sealing surface 78 that extends a predetermined depth into the sealing surface to partially accommodate the O-ring 68.

In a preferred embodiment, the housing has a diameter of approximately 38 millimeters (1 ½ inches) and a housing wall length of approximately 16 millimeters (⅝ inches). The housing 70 comprises a number of sensor ports 84 extending in a radial manner from outside the housing 70 toward the sensing chamber 76. Each sensor port can be configured to accommodate the placement of different types of sensing devices of different technologies therein, such as conductivity sensors, ultrasonic sensors, capacitive sensors, fiber-optic sensors and the like. In the semi-conductor industry, due to both the extremely corrosive nature of the processing chemical agents used and the need to eliminate potential causes of process contamination, it is desired that the selected sensor technology be non-invasive, i.e., not contact the process liquid, and be intrinsically safe.

In a preferred embodiment, the sensor ports 84 are configured to accommodate the placement of fiber-optic sensors therein, and have a diameter of approximately 5 millimeters (3/16 inches) to accommodate the same. Using fiber-optic sensor technology is desirable because the presence of a liquid within the sensing chamber 76 can be detected without physical contact between the liquid and fiber-optic cable i.e., non-invasive, by the difference in refraction or the refractive index caused by the presence of the liquid in the chamber. Accordingly, fiber-optic technology avoids the need to have a chemically resistant sensor, eliminates the danger of explosion, and eliminates the potential for process contamination.

Figure 4:
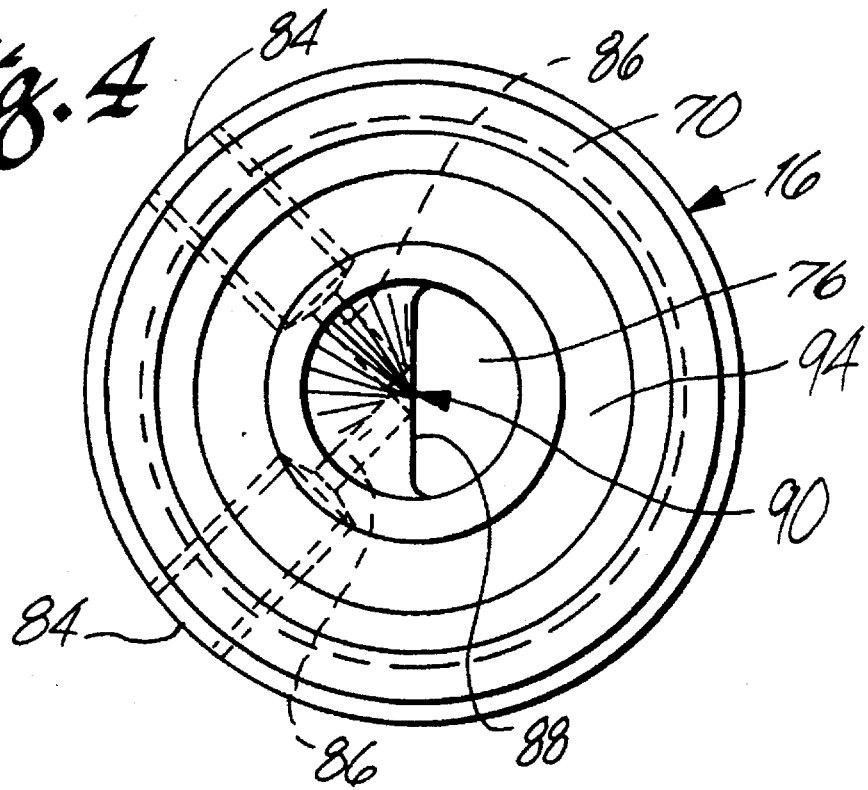
FIG. 4 is a bottom plan semi-schematic view of a sensor module used to form the leak-sensing apparatus shown in FIGS. 1 and 2.

As best shown in FIG. 4, in a preferred embodiment, the sensor module 16 comprises two sensor ports 84 positioned 90 degrees from one another. Each sensor port comprises a threaded wall to accommodate threadable engagement with a respective fiber-optic cable therein. The threaded wall extends a partial distance toward the sensing chamber 76 and stops roughly midway between the outside housing surface and the sensing chamber. Each sensor port comprises a cable port 86 that extends from the terminal portion of the threaded wall to a position adjacent to a wall 88 defining the sensing chamber 76. Each cable port has a diameter of sufficient dimension to accommodate the placement of a fiber-optic cable (not shown) therein. The sensor ports are placed 90 degrees apart from each other so that each fiber-optic cable within each respective sensor port is directed at a single refraction point 90 on the wall 88 of the sensing chamber.

The sensing chamber 76 is configured having a semi-circular-shaped opening to accommodate the placement of the fiber-optic cables within the sensor module housing without entering the sensing chamber. Referring now to FIGS. 2 and 5, each end of the sensing chamber 76 comprises a concave or funnel-shaped opening 89 to permit the collection and free drainage of liquid entering the liquid inlet module 14 into the sensing chamber for detection. In a preferred embodiment, the sensing chamber has a radial dimension of approximately 6 millimeters (1/4 inch).

Figure 6:
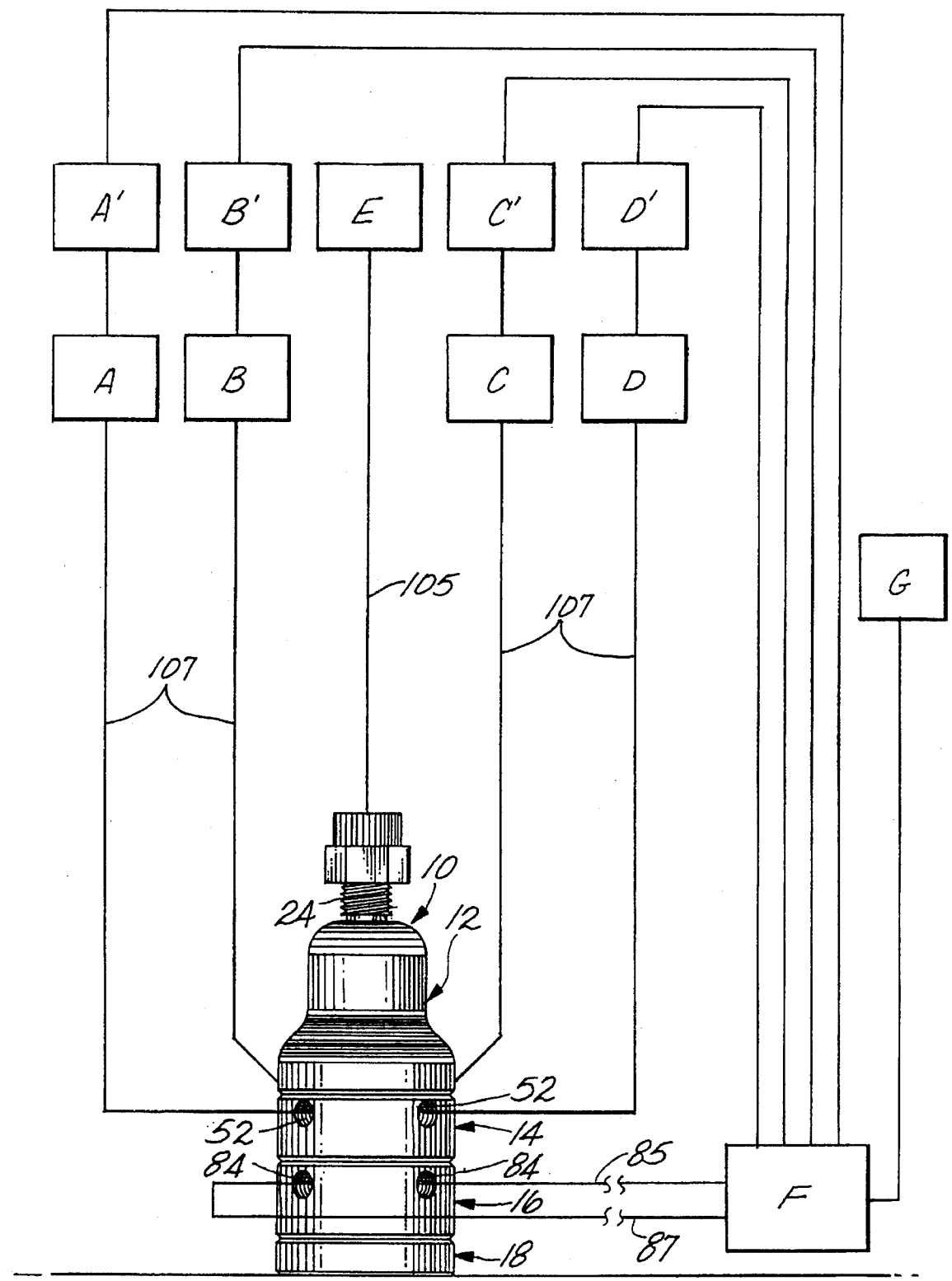
FIG. 6 is a semi-schematic diagram of a leak-detection system comprising the leak-sensing apparatus illustrated in FIGS. 1, 2 and 5 connected to a number of fluid handling devices, a vapor handling device and an external leak-detection controller.

The fiber-optic sensors comprise a transmitting fiber-optic cable 85 and a receiving fiber-optic cable 87, shown in schematic form in FIG. 6. Each receiving and transmitting fiber-optic cable is placed in a respective sensor port 84. The fiber-optic cables are able to detect the presence of a liquid within the sensing chamber from a position behind the wall 88 of the sensing chamber 78 by sensing the difference in the refractive index of refractive point 90 without the liquid present, i.e, the refractive index of the material used to construct the sensor module 16, and that of the refractive index after the liquid has entered the sensing chamber, i.e., the refractive index of the material used to construct the sensor module 16 as modified by the presence of the liquid. An external controller, shown in schematic as F in FIG. 6, is used to generate and transmit a signal of light having a predetermined degree of intensity through the transmitting fiber-optic cable 85 and onto the refraction point 90 on the wall 88 of the sensing chamber 76. The controller measures the difference in refraction or percent transmission of the light signal that is carried through the receiving fiber-optic cable 87 and may be configured to signal an alarm and/or shut down certain fluid handling devices when such difference is detected.

Referring back to FIGS. 2 and 5, the sensor module attachment opening 74 comprises a female threaded coupling 75 to accommodate threadable engagement with an adjacent apparatus member. A circular generally planer recessed sealing surface 92 is positioned perpendicular to the axis of the sensing chamber 76. The sealing surface 92 comprises a slot 94 positioned radially around the sealing surface 92 that extends a predetermined depth into the sealing surface to partially accommodate an O-ring 96 used to ensure an air and liquid-tight seal between the sensor module 16 and the adjacent apparatus member.

As shown in FIGS. 1, 2 and 5, the apparatus member connected to the sensor module in a preferred embodiment is the base module 18. The base module 18 comprises an annular housing 98 having cylindrical configuration and an attachment coupling 100 that is configured having a male threaded coupling 101 to facilitate threadable attachment with the complementary female threaded coupling 75 of the sensor module 16. The Attachment coupling comprises a circular generally planer sealing surface 102 perpendicular to the axis of the sensing chamber 76, when attached with the sensor module 16. The sealing surface 102 comprises a recessed slot 104 positioned radially around the sealing surface and extending a predetermined depth into the sealing surface to partially accommodate the O-ring 96 upon threadable attachment with attachment opening 74 of the sensor module 16. In a preferred embodiment, the housing 98 has an outside diameter of approximately 38 millimeters (1½ inches), and a wall length of approximately 8 millimeters (5/16 inches).

The base module 18 comprises a solid member that, unlike the liquid inlet module and sensor module, is configured without a central chamber. If desired, the base module may have a threaded opening 106 in a backside surface to accommodate a mounting bolt or screw to fixedly attach the apparatus to a mounting fixture or the floor.

The gas module, piston, liquid inlet module, check balls, sensor module, and base module can be formed from materials that are thermally and chemically resistant to the extremely corrosive chemicals and high process temperatures used in semiconductor manufacturing operations. Such process chemicals include strong inorganic acids such as hydrofluoric acid (HF), hydrochloric acid (HCl), sulfuric acid ($H_2SO_4$) and the like, strong inorganic bases such as sodium hydroxide (NaOH), peroxides, and strong solvents. In semiconductor manufacturing, these and other chemicals are used during etching operations and are typically heated to near boiling-point temperatures to enhance the etching efficiency of the chemicals and, thus enhance semiconductor manufacturing efficiency overall.

It is important that the material selected be thermally and chemically resistant and capable of withstanding contact with the above-identified chemicals to ensure that any liquid leaking into the apparatus will be contained therein, and not be leaked to the surrounding environment. Accordingly, preferred materials for forming the gas module, piston, liquid inlet module, check balls, sensor module, and base module include fluoropolymeric compounds such as polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. A particularly preferred material is PTFE.

It is also desired that the material selected to form the O-ring seals positioned between each apparatus member be both thermally and chemically resistant for the same reasons previously discussed above. In a preferred embodiment, the O-ring seals are each made from an elastomeric material, such as nitrile rubber and the like, that is coated with a fluoropolymeric compound such as those previously described above. A particularly preferred coating material being PTFE. An O-ring seal constructed in this manner is desirable because the material comprising the inner portion of the O-ring provides an elastomeric resilience that opposes the compression force exerted upon the O-ring by attaching apparatus members without crushing, enabling an air and liquid-tight fit. The outside casing of fluoropolymeric compound provides the thermal and chemical resistance needed to protect the inner elastomeric material from the destructive effects of contact with the corrosive chemicals used in semiconductor manufacturing. In a preferred embodiment, each O-ring seal is are configured having the same outside diameter of approximately 24 millimeters ($15/16$ inches) and the same inside diameter of approximately 19 millimeters ($3/4$ inches).

Alternatively, the O-ring can be made from a single elastomeric compound having the combined desired elastomeric properties and thermal and chemical resistance so that an outside casing of dissimilar material is not required.

Referring to FIG. 5, the leak-sensing apparatus is constructed by threadably attaching the gas module 12, liquid inlet module 14, sensor module 16, and base module 18 together placing O-rings 42, 68 and 96 between each apparatus member to ensure an air and liquid-tight seal. The housing of the gas module, liquid inlet module, sensor module, and base module each have a diameter of approximately similar dimension, forming an apparatus having a substantially cylindrical configuration of uniform dimension. The total height of the assembled apparatus is approximately 89 millimeters (3½ inches) as measured from the physical bottom of the base module 18 to the tip of the air outlet 24.

Referring now to FIG. 6, the assembled leak sensing apparatus 10 is installed to detect liquid leakage from a number of fluid-handling devices A, B, C and D by connecting the air outlet 24 via an air transfer tube 105 to an air purification device or to a vent directed to the atmosphere, collectively represented as E. A liquid transfer tube 107 is connected to a portion of each fluid handling device that is configured to register and accommodate liquid leakage upon the failure of a fluid handling element, such as a pump seal, diaphragm and the like. Each liquid transfer tube 107 is routed to the apparatus 10 and threaded into a respective liquid inlet port 52 for liquid-tight engagement in the liquid inlet module 14. Fiber-optic transmitting and receiving cables 85 and 87 are inserted into respective cable ports 86 in the sensor module 16. A controller F is configured to register any difference in the refractive index of the refraction point 90 as sensed by the fiber-optic cables and can be programmed to signal an alarm G and/or send a signal to the actuating member A', B', C' and D' of each fluid-handling device A, B, C and D, respectively, to deactivate the fluid-handling device.

Referring now back to FIG. 2, the piston 30 is shown in phantom near the physical bottom of the chamber 28. This position of the piston corresponds to a state of operation for the apparatus that has not received or detected liquid from a failed fluid-handling device. Once a fluid-handling device has failed, a volume of the leaking process liquid is transported from the device to the liquid inlet module 14 via the liquid transfer line. The liquid transported through the line will displace a volume of air contained within the line and direct the air into the apparatus. The pressure generated in the transport line will displace the check ball 56, compressively engaged against the outlet end 53 of the liquid inlet port 52, causing the air to enter the internal chamber 46 of the liquid inlet module 14. As the volume of air entering the apparatus increases, the air pressure within the apparatus increases, causing the piston to be displaced upwardly into the chamber 28 to accommodate the volume of air displaced by the liquid, as shown in FIG. 2. The air contained in the chamber 28 between the piston and the air outlet 24 is displaced from the chamber through the air outlet by the upward movement of the piston within the chamber. This air is routed away from the apparatus where it may be vented to the atmosphere or routed to an air processing unit for physical and/or chemical treatment before being released to the atmosphere.

Alternatively, instead of using a piston arrangement to restrict the release of leaking gas and liquid entering the apparatus to the environment, the apparatus may be configured having a valve (not shown) attached to the air outlet that could be activated to close when the sensing system detects the presence of liquid in the apparatus. In yet another alternative arrangement, the gas module 12 can be configured having a diaphragm or bellows-type gas accommodating means in place of the chamber 28 to allow the apparatus to accommodate and contain a greater volume of air passed through the liquid transfer tubes.

Because of the limited volume of the chamber 28 it is important that tile liquid transfer lines be sized so that the air volume contained within each line is not greater than the combined air volume of the gas accommodation chamber 28 and the internal chamber 46.

Once the air within the transfer tube has been purged, the leaking process liquid enters the liquid inlet module 14 and passes downwardly by gravity through the internal chamber 46 and into the sensing chamber 76 of the sensor module 16. As the liquid enters the sensing chamber it passes to the base module 18 and begins to fill the chamber, causing the liquid level to rise to a point commensurate with the refraction point 90 at the wall 88 of the sensing chamber 76. The presence of liquid at the refraction point causes the refractive index sensed by the fiber-optic cables to change, activating a desired response by the controller. Depending on the desired degree of leak-sensing sensitivity, the leak-detection controller can be configured to sense the difference in refractive index caused either by the presence of the liquid coating the wall or by the presence of a liquid volume filling tile sensing chamber. Accordingly, because the passage of liquid to the sensing chamber is based on gravity it is important that the apparatus be mounted in an upright position, i.e., with the base module planer with the floor.

The liquid leaked into the apparatus will continue to fill the sensing chamber 76 until appropriate control steps are taken no deactivate the leaking fluid-handling device. If left activated, the leaking liquid will continue to enter the apparatus and fill the sensing chamber and internal chamber 46 until the liquid and gas pressure within the apparatus is equal to that of the leaking liquid. Leaking liquid entering the apparatus will not escape through the remaining liquid inlet ports due to the operation of the check balls 56, and will not escape through the air outlet due to the seating action of the piston 30 therein. The apparatus constructed according to principles of this invention is capable of retaining leaked gas and liquid therein while subject to internal pressures up to approximately 150 psig generated from a leaking fluid-handling device.

Accordingly, the apparatus comprises a closed-system method of sensing leakage of potentially hazardous and toxic liquids from a fluid-handling device and safely containing such toxic liquids within, thereby preventing the leaking of toxic chemical liquid and vapor to the environment.

Although the embodiment of the leak-sensing apparatus described above and illustrated in FIGS. 1, 2, 5 and 6 comprises a single liquid inlet module and, therefore is configured to accommodate up to four liquid transfer tubes from the same number of fluid handling devices, it is to be understood that the leak-sensing apparatus may be configured other than specifically described without departing from the spirit of this invention. For example, FIG. 7 illustrates an alternative embodiment of the leak-sensing apparatus comprising more than one liquid inlet module 14 stacked on top of one another. The leak-sensing apparatus may be constructed in this manner to accommodate more than four liquid transfer tubes, e.g., the use of two liquid inlet modules accommodates leak sensing of approximately eight fluid handling devices.

Alternatively, the leak-sensing apparatus can be configured having three or four liquid inlet modules stacked on top of one another to accommodate leak sensing of approximately 12 and 16 fluid handling devices, respectively. It has been discovered that four liquid inlet modules is preferred maximum because the gas accumulation chamber 28 is configured to accommodate an gas volume corresponding to approximately four liquid inlet modules. However, as previously mentioned above, the leak-sensing apparatus can be constructed with a diaphragm or bellows-type gas accumulating means in place of the chamber 28 that would effectively increase the amount of gas volume accommodated and, thus increase the number of liquid inlet modules that can be used.

A concern inherent with using multiple stacked liquid inlet modules occurs with the transfer of semi-viscous or viscous leaking liquids from the failed fluid-handling device into the apparatus and the possibility of air bubble formation in the sensing chamber 76 interfering with the ability of the fiber-optic sensing system to detect the presence of such liquid and, thus leakage. Semi-viscous or viscous liquids generally have slower gravity flow rates due to both the viscosity of the liquid itself and enhanced surface wetting. As a leaking viscous liquid enters a inlet liquid module 14 and flows into the internal chamber 46 the reduced flow rate and enhanced surface wetting may cause the liquid to travel around and wet the entrance of either the internal chamber 46 or the sensing chamber 76 rather than flow downwardly by gravity into each. As the liquid continues to accumulate about the entrance of the internal or sensing chamber, a liquid seal is formed that traps the air contained within internal chamber and/or sensing chamber, forming an air pocket or bubble therein. The presence of such an air pocket interferes with the ability of the fiber-optic sensors to detect the presence of a leaking liquid because, although leaking liquid has entered and is present in the apparatus, the leaking liquid is not present in the sensing chamber 76 to thereby cause a change in the refractive index.

FIG. 8 illustrates an alternative embodiment of the leak-sensing apparatus that addresses this concern by having a construction with the sensor module 16 interposed between the gas module 12 and a stack of two liquid inlet modules 14. Configured in this manner, viscous liquid entering the apparatus will flow downwardly filling the combined internal chambers 46 of each liquid inlet module 14, causing the liquid level to rise upwardly into the sensing chamber 76 to the refraction point 90 for detection by the fiber-optic cables. The placement of the sensor module 16 on top of the stacked liquid inlet modules 14 eliminates the possibility of nondetection due to bubble formation in the sensing chamber. This alternative embodiment does, however, impose an inherent lag time between the time that a leaking liquid enters the apparatus and tile time it is detected by the fiber-optic sensing system due to the increased liquid volume of the combined internal chambers 46 that must be filled before the liquid reaches the refraction point in the sensor module.

Although limited embodiments of the leak-sensing apparatus have been specifically described and illustrated herein, many modifications and variations will be apparent to those skilled in the art. Accordingly, it is to be understood that, within the scope of the appended claims, the leak-sensing apparatus according to principles of this invention may be embodied other than as specifically described herein.

What is claimed is:

1. An apparatus for detecting leakage of liquids from a fluid handling device, the apparatus comprising:

at least two separate module structures mounted one on top of the other, each of said modules having an open interior cavity;

an inlet through which liquids and gases leaking from the fluid handling device enter the interior cavity of a first of said modules, wherein the leaking liquid flows by gravity into the cavity of a second such module located below the first module;

means for prohibiting gases and liquids that leak into the apparatus from escaping therefrom; and means mounted in one of said modules for detecting the presence of liquid leaking into the apparatus.

2. The apparatus as recited in claim 1 wherein said liquid detecting means is non-invasive.

3. The apparatus as recited in claim 1 wherein the interior cavities defined by the modules in combination define a chamber which is configured to accommodate a predetermined volume of gas entering the apparatus, the uppermost module having an air outlet at a partially closed end.

4. The apparatus as recited in claim 3 wherein the means for prohibiting the gases and liquids from escaping the apparatus comprises a piston slidably mounted within the chamber, the piston interfacing with a valve seat at the air outlet within the chamber when the predetermined volume of gas is achieved to prohibit the escape of gases and liquids leaked into the apparatus.

5. An apparatus for detecting leakage of liquids from a fluid handling device, the apparatus comprising:

at least two separate module structures mounted one on top of the other, each of said modules having an open interior cavity;

an inlet through which liquids and gases leaking from the fluid handling device enter the interior cavity of a first of said modules, wherein the leaking liquid flows by gravity into the cavity of a second such module located below the first module;

means for prohibiting gases and liquids that leak into the apparatus from escaping therefrom; and means mounted in one of said modules for detecting the presence of liquid leaking into the apparatus, wherein the means for detecting the presence of liquid within the apparatus comprises a sensor module having at least one sensor inlet, the sensor module having a chamber for accommodating the liquid, the sensor inlet accommodating a sensor capable of detecting the presence of liquid within the chamber without physically contacting the liquid.

6. An apparatus for detecting leakage of liquids from a fluid handling device, the apparatus comprising:

at least two separate module structures mounted one on top of the other, each of said modules having an open interior cavity;

an inlet through which liquids and gases leaking from the fluid handling device enter the interior cavity of a first of said modules, wherein the leaking liquid flows by gravity into the cavity of a second such module located below the first module;

means for prohibiting gases and liquids that leak into the apparatus from escaping therefrom; and means mounted in one of said modules for detecting the presence of liquid leaking into the apparatus, wherein the inlet comprises a module having at least one inlet port for accommodating the passage of leaking liquids from a fluid handling device.

7. An apparatus for detecting liquid leakage from a fluid handling device, the apparatus comprising:

at least one liquid inlet module having at least one liquid inlet port for entry of liquids from a fluid handling device;

a sensor module removably connected to the liquid inlet module comprising means for detecting leakage;

a venting means for enabling the venting of air within the apparatus to accommodate the passage of gases and liquids toward and into the apparatus; and means for closing the venting means so that gases and liquids leaked into the apparatus are contained therein.

8. The apparatus as recited in claim 7 wherein the venting means comprises a chamber in communication with the liquid inlet module configured to accommodate a predetermined volume of gas that is passed through the liquid inlet module and into the apparatus.

9. The apparatus as recited in claim 8 wherein the means for closing the venting means comprises a valve positioned within the chamber to close off passage of air within the chamber to the atmosphere upon accommodation of the predetermined volume of gas.

10. The apparatus as recited in claim 9 wherein the valve comprises:

a piston slidably disposed within the chamber;

an air outlet at a partially closed end of the chamber; and a valve seat within the chamber at the air outlet to accommodate interface with the piston to form an air-tight seal upon movement of the piston against the valve seat in response to gas and liquid pressure within the apparatus.

11. The apparatus as recited in claim 10 comprising a gas module in communication with the liquid inlet module, the gas module housing the venting means and the means for closing the venting means.

12. The apparatus as recited in claim 7 wherein each liquid inlet module comprises:

an annular housing;

an internal chamber disposed within the housing in communication with the liquid inlet port;

a check ball disposed within the chamber and compressively engaged against an outlet end of each liquid inlet port to ensure the one-way flow of gas and liquid into the apparatus.

13. The apparatus as recited in claim 12 wherein each liquid inlet module comprises four liquid inlet ports.

14. The apparatus as recited in claim 7 wherein the sensor module comprises:

an annular housing;

a sensing chamber disposed within the housing; and at least one sensor port for accommodating the means for detecting leakage therein.

15. The apparatus as recited in claim 14 wherein the means for detecting leakage comprises at least one sensor that operates under principles of detection technology selected from the group consisting of fiber-optic detection, conductivity conduction, and ultrasonic detection.

16. An apparatus for detecting and containing leaking liquid and gases from a fluid handling device, the apparatus comprising:

a gas module positioned at the physical top of the apparatus for accommodating a predetermined volume of liquid and gas Leaking into the apparatus from a fluid handling device;

a base module positioned at the physical bottom of the apparatus for accommodating placement of the apparatus against a planer surface;

at least one liquid inlet module removably disposed between the gas module and the base module, each liquid inlet module having at least one inlet port for accommodating the passage of liquid and gas leaking from a fluid handling device therethrough; and a sensor module removably disposed between the gas module and the base module and in communication with a liquid inlet module, the sensor module having at least one sensor inlet port for accommodating a sensor for detecting the presence of liquid leaking into the apparatus.

17. The apparatus as recited in claim 16 wherein the gas module comprises:

an annular housing;

a chamber positioned within the housing;

a piston disposed within the chamber and slidably movable within the chamber in response to gas and liquid pressure within the apparatus; and an air outlet at a partially closed end of the chamber, the piston closing the air outlet upon the accommodation of the predetermined volume of gas within the chamber.

18. The apparatus as recited in claim 16 wherein each liquid inlet module comprises:

an annular housing;

an internal housing disposed within the chamber in communication with the liquid inlet port;

a check ball positioned within the internal chamber at an outlet end of each liquid inlet port to ensure one-way flow of leaking liquid and gas into the apparatus; and resilient means for maintaining compressive engagement of the check ball against the outlet end.

19. The apparatus as recited in claim 16 wherein the sensor module comprises:

an annular housing;

a sensing chamber disposed within the housing in fluid flow communication with the liquid inlet module, each sensor inlet port being positioned adjacent the sensing chamber to facilitate detection of leaking liquid contained within the sensing chamber by the sensor.

20. The apparatus as recited in claim 19 wherein the sensor used to detect the presence of liquid within the sensing chamber is selected from the group consisting of fiber-optic sensors, conductivity sensors, and ultrasonic sensors.

21. The apparatus as recited in claim 20 wherein the sensor module comprises two sensor inlet ports positioned approximately 90 degrees from each other, one sensor inlet port accommodating a transmitting fiber-optic cable and the other sensor inlet accommodating a receiving fiber-optic cable, the transmitting and receiving fiber-optic cables being directed to a common refraction point located on a wall defining the sensing chamber.

22. The apparatus as recited in claim 16 wherein assembly of the gas module, each liquid inlet module, the sensor module, and the base module forms a central chamber for containing leaking liquid from a fluid handling device therein.

23. The apparatus as recited in claim 22 wherein the modules are arranged with one another in a stacked configuration, and wherein O-ring seals are interposed, between modules.

24. The apparatus as recited in claim 23 wherein the gas module is removably attached to a liquid inlet module and the base module is removably attached to the sensor module.

25. The apparatus as recited in claim 23 wherein the gas module is removably attached to the sensor module and the base module is removably attached to a liquid inlet module.

26. An apparatus for detecting and containing leaking liquids and gases from a fluid handling device, the apparatus comprising:
  at least two separate module structures mounted one on top of the other;
  means for accommodating the passage of gas and leaking liquid from a fluid handling device into the apparatus;
  means for accommodating a predetermined volume of gas passed into the apparatus;
  means for preventing the escape of the predetermined volume of gas accommodated within the apparatus; and
  means for detecting the presence of leaking liquid within the apparatus, wherein the detecting means is configured to accommodate a volume of liquid, and wherein the liquid is accommodated in a module different from a module housing the gas accommodating means.

27. An apparatus for detecting and containing leaking liquids and gases from a fluid handling device, the apparatus comprising:
  at least two separate module structures mounted one on top of the other;
  means for accommodating the passage of gas and leaking liquid from a fluid handling device into the apparatus, wherein the means for accommodating the passage of gas and leaking liquid comprises at least one liquid inlet module having:
    at least one liquid inlet port for receiving leaking liquid from a leaking fluid handling device; and
    an internal chamber in fluid flow communication with the liquid inlet port;
  means for accommodating a predetermined volume of gas passed into the apparatus;
  means for preventing the escape of the predetermined volume of gas accommodated within the apparatus; and
  means for detecting the presence of leaking liquid within the apparatus.

28. The apparatus as recited in claim 27 wherein each liquid inlet module further comprises means for ensuring one-way liquid and gas flow into the apparatus.

29. The apparatus as recited in claim 27 wherein the means for accommodating a predetermined amount of gas comprises a chamber of predetermined volume in communication with the liquid inlet module.

30. The apparatus as recited in claim 29 wherein the means for preventing the escape of gas from the apparatus comprises a valve:
  an air outlet at a partially closed end of the chamber;
  a piston slidably disposed within the chamber between the air outlet and a portion of the chamber in communication with each liquid inlet module; and
  a seat within the chamber adjacent the air outlet configured to accommodate placement of the piston therein in response to gas and liquid accommodated within the apparatus to prevent the passage of gas through the air outlet.

31. The apparatus as recited in claim 30 wherein the means for detecting the presence of leaking liquid within the apparatus comprises a sensor module in fluid flow communication with the liquid inlet module, the sensor module having:
  at least one sensor inlet to accommodate the placement of a sensor therein; and
  a sensing channel to accommodate placement of leaking liquid therein, each sensor inlet being positioned adjacent to the sensor channel.

32. The apparatus as recited in claim 31, wherein the sensor for detecting the presence of liquid is selected from the group consisting of fiber-optic sensors, conductivity sensors, and ultrasonic sensors.

* * * * *

UNITED STATES PATENT AND TRADEMARK OFFICE
CERTIFICATE OF CORRECTION

PATENT NO. : 5,476,004
DATED : December 19, 1995
INVENTOR(S) : Kenji A. Kingsford It is certified that error appears in the above-indentified patent and that said Letters Patent is hereby corrected as shown below:

```
Abstract, line 4, change "other" to -- another --.
Column 4, line 15, change "engagably" to -- engageably --.
Column 7, line 17, after "cable" insert a comma.
Column 8, line 25, change "Attachment" to -- attachment --.
Column 9, line 24, delete "are".
Column 10, lines 37,56, change "tile" to -- the --
          (both occurrences).
Column 10, line 62, change "no" to -- to --.
Column 11, line 34, change "an gas" to -- a gas --.
Column 11, line 52, change "a inlet" to -- an inlet --.
Column 12, line 13, replace "tile" with -- the --.
Column 14, line 23, change "Leaking" to -- leaking --.
Column 15, line 23, after "interposed" delete the comma.

Column 16, line 26, after "comprises" delete "a valve".
```

Signed and Sealed this

Seventh Day of January, 1997

Attest:

BRUCE LEHMAN

*Attesting Officer*     *Commissioner of Patents and Trademarks*